June 4, 1935.  G. R. WOOTEN  2,004,026
GUARD
Filed Aug. 14, 1933   2 Sheets-Sheet 1
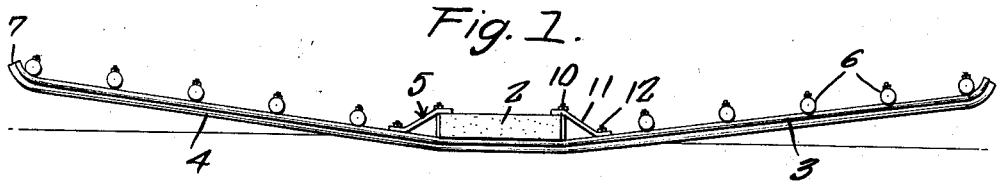
Fig. 1.
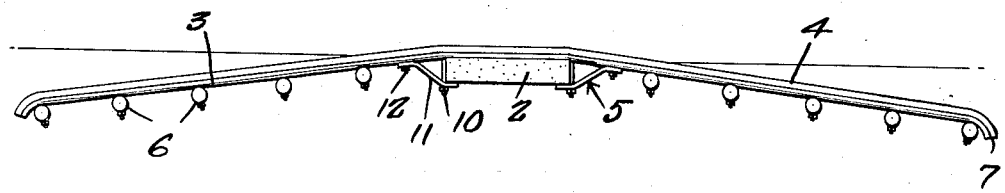
Fig. 2.
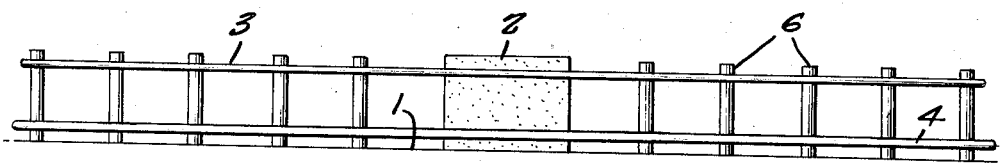
Fig. 3.   Fig. 4.
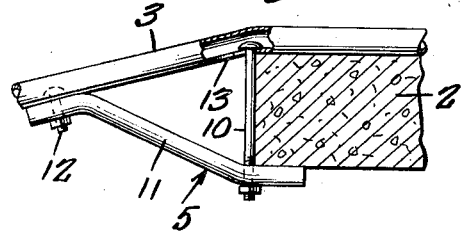
George R. Wooten,
INVENTOR
BY *Victor J. Evans & Co.*
ATTORNEY
WITNESS June 4, 1935.  G. R. WOOTEN  2,004,026
GUARD
Filed Aug. 14, 1933  2 Sheets-Sheet 2
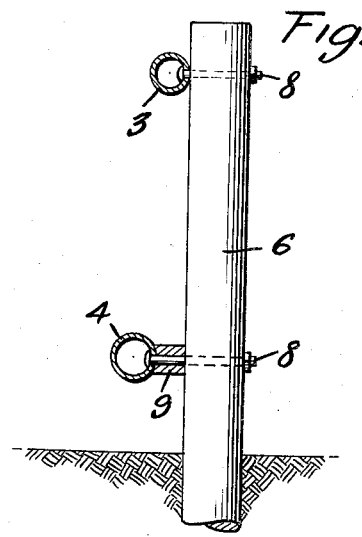
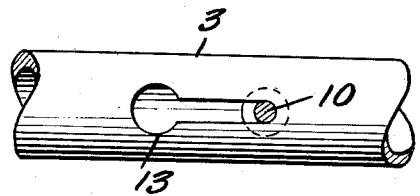
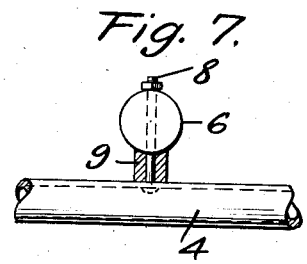
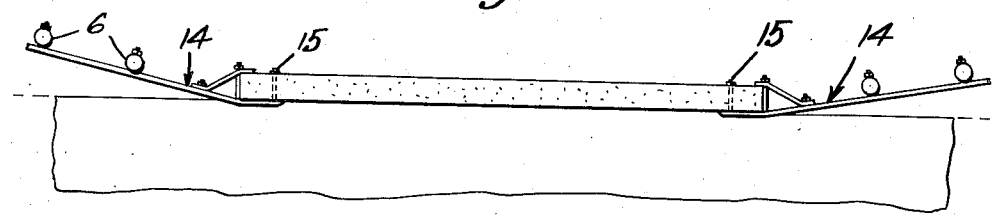
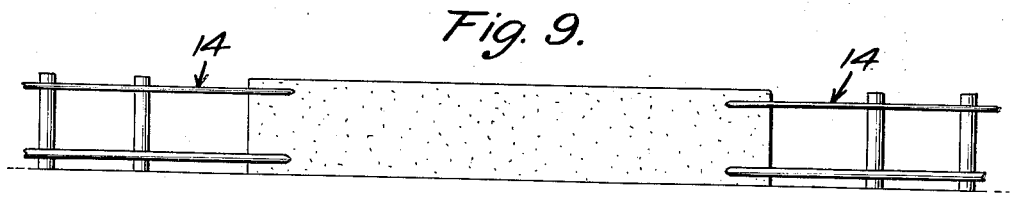
George R. Wooten,
INVENTOR Patented June 4, 1935

2,004,026

UNITED STATES PATENT OFFICE 2,004,026

GUARD

George Riley Wooten, Fredonia, Kans.

Application August 14, 1933, Serial No. 685,112

2 Claims. (Cl. 256—13.1)

This invention relates to guards and has for the primary object the provision of a device of the above stated character which is especially adapted for highways to protect and prevent motor vehicles from running off of the highway at dangerous places or curves in highways and and from colliding with abutments of bridges, culverts and the like and is so constructed as to provide a guide for a vehicle towards the highway when engaged by the vehicle and also to prevent turning over of the vehicle.

With these and other objects in view this invention consists in certain novel features of construction, combination and arrangement of parts to be hereinafter more fully described and claimed.

For a complete understanding of my invention, reference is to be had to the following description and accompanying drawings, in which In the drawings:

Figure 1 is a top plan view illustrating a guard constructed in accordance with my invention.

Figure 2 is a side elevation illustrating the same.

Figure 3 is a fragmentary detail sectional view showing the means of connecting the guard to an abutment.

Figure 4 is a detail view illustrating the same.

Figure 5 is a detail view, partly in section, illustrating the connection of the guard rails to the supporting post.

Figure 6 is a fragmentary plan view, partly in section, illustrating the means of connecting the tie bolt to the guard rail.

Figure 7 is a detail view, partly in section, illustrating the connection between the guard rail and the post.

Figure 8 is a fragmentary plan view illustrating a modified form of my invention.

Figure 9 is a side elevation illustrating the same.

Referring in detail to the drawings, the numeral 1 indicates a roadway having therein a culvert, the abutments 2 thereof having my invention applied thereto. A vehicle traveling upon the roadway will be prevented from running into the abutments 2 and should the vehicle become out of control and start off of the roadway adjacent the abutments it will be guided back onto the roadway and also be prevented from turning over.

My invention consists of upper and lower guard rails 3 and 4 secured to an abutment 2 by clamps 5 and also supported by relatively spaced posts 6. The posts 6 are arranged alongside of the roadway at opposite ends of the abutments 2 and support the guard rails in such a manner that the guard rails after leaving the abutments gradually curve away from the roadway and they have curved ends 7 directed laterally from the roadway about the end posts. The guard rails are preferably of cylindrical form and the lower guard rail is supported so that it lies in a plane slightly below the plane of the hub of the wheel of a vehicle, while the upper guard rail is located in a plane which will be above the hub of the wheel of the vehicle and opposite to the fenders of the vehicle. The upper guard rail is positioned slightly laterally of the lower guard rail or, in other words, the lower guard rail lies closer to the roadway than the upper guard rail so that a vehicle out of control coming in engagement with the guard will first engage the lower guard rail with the wheels thereof, permitting the lower guard rail to have a tendency to turn the front or steering wheels of the vehicle in the direction of the roadway and should the vehicle have a tendency to turn over when engaging the guard, the upper guard rail will be engaged by the fenders of the vehicle and thereby prevent complete turning over or upsetting of the vehicle. The upper guard rail 3 is secured to the posts 6 by bolts or like fasteners 8 and the lower guard rail is similarly connected to the posts except it is spaced a distance from the posts by spacers 9. Each clamp 5 employed for connecting the guard to the abutment consists of a headed bolt 10 and a bracket 11. One end of the bracket 11 is secured to the guard rail, as shown at 12, while the opposite end engages the abutment and is apertured to receive the bolt 10, the headed portion of the latter extending into a key hole slot 13 of the respective guard rail so as to confine the headed portion of the bolt within the guard rail leaving a smooth surface upon the guard rail for the vehicle to contact with. The lower guard rail being positioned away from the posts 6, the hub of the wheels of the vehicle will be prevented from coming in direct contact with the posts or any other protruding part at the side of the vehicle.

As shown in Figures 1 and 2, the guards extend at opposite sides of the abutments and when employed in connection with bridges having comparatively long abutments the guards are made in sections, as shown at 14, each section being secured to the ends of the abutments by the clamps 5 and also bolts or like fasteners 15 passing through the abutments.

While I have shown and described the preferred embodiment of my invention, it will be understood that minor changes in construction, combination and arrangement of parts may be made without departing from the spirit and scope of my invention, as claimed.

Having described the invention, I claim:

1. A guard comprising upper and lower horizontally disposed rails extending beyond the ends of an abutment with the upper rail located laterally of the lower rail, supporting posts for the rails, braces secured to the rails and engaging the abutment, and tie bolts between the rails and the braces for drawing the latter into engagement with the abutment.

2. In combination with an abutment, upper and lower guard rails extending from the ends of the abutment and curving laterally away from the side of a road, posts for supporting the rails, and clamps detachably connecting the rails to the abutment.

GEORGE RILEY WOOTEN.